United States Patent [19]

Watanabe

[11] 4,197,565

[45] Apr. 8, 1980

[54] SYSTEM FOR REPRODUCING A VIDEO SIGNAL RECORDED IN PARALLEL TRACK SECTIONS ON A RECORDING MEDIUM

[75] Inventor: Yoshimi Watanabe, Yokohama, Japan

[73] Assignee: Sony Corporation, Tokyo, Japan

[21] Appl. No.: 936,732

[22] Filed: Aug. 25, 1978

[30] Foreign Application Priority Data

Aug. 26, 1977 [JP] Japan ................. 52/102220

[51] Int. Cl.² ............ G11B 21/10; G11B 21/04; G11B 5/52
[52] U.S. Cl. ........................... 360/77; 360/84; 360/107; 360/109
[58] Field of Search ............ 360/77, 70, 109, 107, 360/84, 78, 10, 108

[56] References Cited

U.S. PATENT DOCUMENTS

| | | | |
|---|---|---|---|
| 3,699,247 | 10/1972 | Mashima | 360/10 |
| 3,905,043 | 9/1975 | Frank | 360/70 |
| 4,056,832 | 11/1977 | de Boer | 360/77 |
| 4,096,535 | 6/1978 | Highnote | 360/84 |
| 4,099,210 | 7/1978 | Dolby | 360/84 |
| 4,099,211 | 7/1978 | Hathaway | 360/107 |
| 4,110,799 | 8/1978 | Bergmans | 360/70 |

FOREIGN PATENT DOCUMENTS

2646449 10/1976 Fed. Rep. of Germany ............ 360/77

Primary Examiner—Alfred H. Eddleman
Attorney, Agent, or Firm—Lewis H. Eslinger; Alvin Sinderbrand

[57] ABSTRACT

In a video signal reproducing system, a head-position control circuit includes a magnetic head scanning a magnetic recording medium for recording and reproducing signals in a recorded track thereon; a head-support member including a piezo-ceramic element supporting the magnetic head on a rotary part, for example of a guide drum; a rotary transformer having a primary coil in a stationary part and a secondary coil in the rotary part; a control signal generator for producing a tracking control signal which corresponds to the signal due to the mis-tracking of the magnetic head relative to a predetermined section of the recorded track, the head-support member being responsive to the tracking control signal to displace the magnetic head transversely with respect to the track section to maintain substantial alignment between the magnetic head and the track section; the tracking control signal being supplied to the primary coil of the rotary transformer; and a control signal processing circuit connected between the secondary coil of the rotary transformer and the head-support member.

12 Claims, 34 Drawing Figures

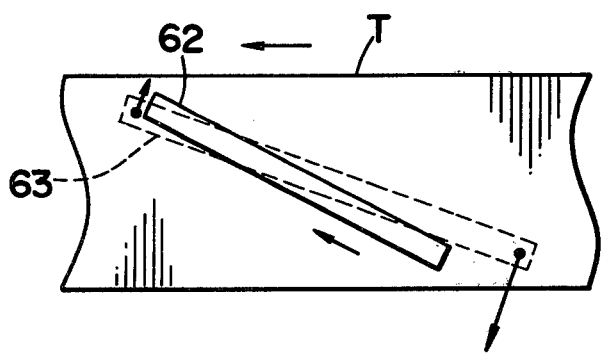
FIG.8A
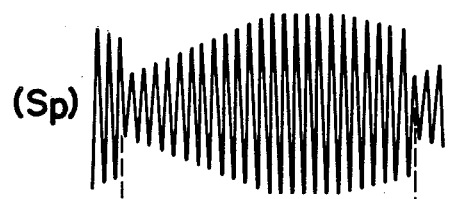
FIG.8B (Sp)
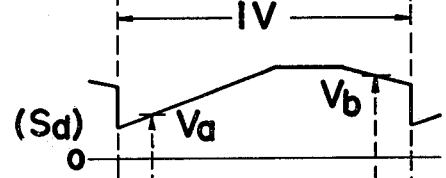
FIG.8C (Sd)
FIG.8D (Pa)
FIG.8E (Pb)
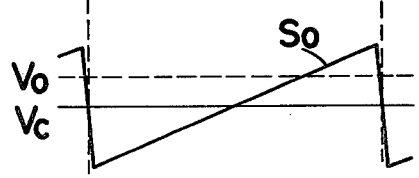
FIG.8F

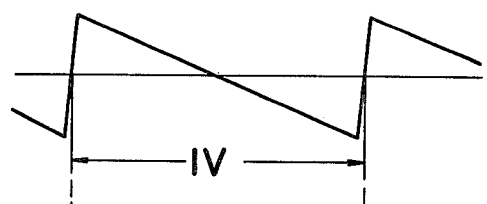
FIG.10A
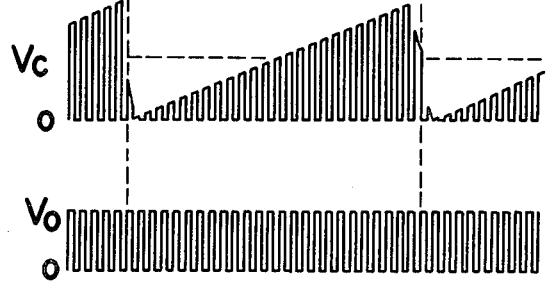
FIG.10B
FIG.10C
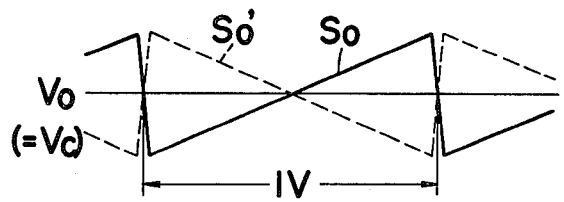
FIG.12A
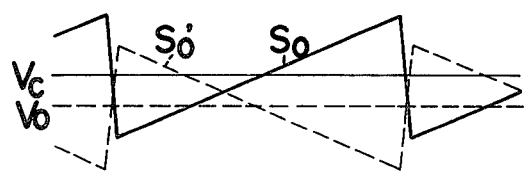
FIG.12B
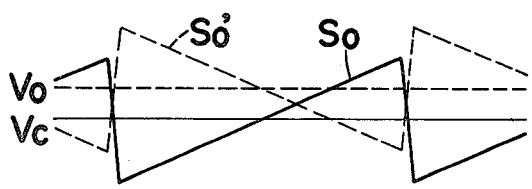
FIG.12C

4,197,565

SYSTEM FOR REPRODUCING A VIDEO SIGNAL RECORDED IN PARALLEL TRACK SECTIONS ON A RECORDING MEDIUM

BACKGROUND OF THE INVENTION

1. Field of the Invention

This invention relates to a system for reproducing a video signal recorded in parallel track sections on a recording medium, and more particularly to a head-position control circuit for a magnetic head scanning a magnetic tape to record or reproduce signals thereon.

Generally, in a VTR (Video Tape Recorder), a magnetic head is mounted at a predetermined position in a rotary head drum assembly. The magnetic head rotates along a predetermined rotary path during recording as the tape moves past it along a helical path. However, it is preferable for various reasons to deflect the magnetic head during its rotation. For example, if tape motion is stopped or slowed for still or slow-motion reproduction, the path of the recording heads across the tape is skewed with respect to the recorded track. This is due to the fact that the recorded track is laid down on a path which includes the motion of the heads plus the motion of the tape. This so-called "tracking error" can be corrected by deflecting the magnetic head in the direction normal to the rotary path so as to align the scanning path of the magnetic head with the recorded track. This permits obtaining of a well produced picture both in the still and the slow-motion mode.

During normal reproduction, the magnetic head can be controlled in the same manner by means of a servo-control. Deflection of the magnetic head in the direction of the rotary path can be employed for adjusting the scanning speed of the magnetic head so as to eliminate any time base error or variation from the reproduced video signal. Deflecting the magnetic head so as to change its direction of the operative gap with respect to the recorded track, is effective to eliminate "cross-talk" between adjacent recorded tracks by utilization of azimuth loss.

2. Description of the Prior Art

Generally, in order to control the position of the magnetic head, the latter is mounted on an electro-mechanical transducer such as a piezo-electric element or a solenoid, and a predetermined drive signal is supplied to the electro-mechanical transducer. The piezo-electric element is capacitive and little electric power is required for driving it. The piezo-electric element requires a high voltage DC drive signal. Rotating joints or connections employing brushes and slip rings have been used to apply the high voltage DC drive signal from the non-rotating part of the apparatus to the rotating member carrying the heads. The brush and the slip ring operate through mechanical sliding contact with each other. Therefore, slip rings and brushes have a short life, provide unstable contact and are a troublesome cause of electrical and/or mechanical noise.

SUMMARY OF THE INVENTION

Accordingly, it is an object of this invention to provide a head-position control system for a rotary magnetic head in which a drive signal can be transmitted to an electro-mechanical transducer supporting the rotary magnetic head without requiring mechanical contact of brush and slip ring, and thereby to improve durability and reliability.

In accordance with an embodiment of this invention, the drive signal is chopped, and the chopped drive signal is supplied to the electro-mechanical transducer through a rotary transducer having its windings connected to stationary and rotating parts of the apparatus.

According to this invention, the circuit can be operated from a power source of low voltage, and it can generate a drive signal of high enough voltage to drive a piezo-electric electro-mechanical transducer. The chopping frequency is selected outside the frequency band of the video signals reproduced from the magnetic head, whereby the interference of the chopped drive signal with the reproduced video signal is avoided.

In another embodiment of this invention, the drive signal is modulated, and the modulated drive signal is supplied through the rotary transformer to the electro-mechanical transducer.

In such other embodiment, a sine wave signal is applied to the rotary transformer. Accordingly, higher harmonic spurious components are small in comparison with the above chopping method. The low level of the spurious components prevent mixing with the video signal. The modulated signal is rectified in the rotating part to provide a power source for driving a drive amplifier. The amplitude of the modulated signal can therefore be small.

A reproducing amplifier can also be provided in the rotary part. After the reproduced signal is amplified, it may be transmitted through the rotary transformer to an output terminal. Accordingly, S/N ratio of the reproduced signal can be improved. Moreover, an erase signal can be generated in the rotary part.

According to this invention, use of rotating transformer connection eliminates electrical or mechanical noise due to mechanical contact of brush and slip ring connections.

A high voltage such as 300 volts is necessary for driving the piezo-electric element. This voltage can be obtained at the secondary of the rotating transformer by the selection of the turns ratio of the primary and secondary windings thereof. Accordingly, the voltage from the power source to the primary winding can be reduced. This low voltage reduces the shock hazard and thereby improves safety.

The chopping frequence may be as low as 100 KHZ. Spurious radiation at the chopping frequency can be kept from interfering with the video signal. Further, since the frequency of the chopped signal to be transmitted is low, core material of high magnetic permeability ($\mu = 3000 \sim 6000$) can be used for the rotary transformer to accurately transmit the amplitude of the signal. Accordingly, the rotor and stator of the rotating transformer can be small, the number of turns on the windings of the rotary transformer can be reduced and magnetic flux leakage can be small.

Various other objects, advantages and features of the present invention will become readily apparent from the ensuing detailed description, and the novel features will be particularly pointed out in the appended claims.

BRIEF DESCRIPTION OF THE DRAWINGS

FIGS. 6A–6F, 7A–7F and 8A–8F are views to which reference will be made in explaining operation of the tracking control for different tracking errors;

FIG. 10A to FIG. 10C are wave forms for explaining operation of the circuit of FIG. 9;

FIG. 12A to FIG. 12C are wave forms for explaining operation of the circuit of FIG. 11.

DESCRIPTION OF THE PREFERRED EMBODIMENTS

Next, a first embodiment of this invention will be described with reference to the drawings.

Figure 1A:
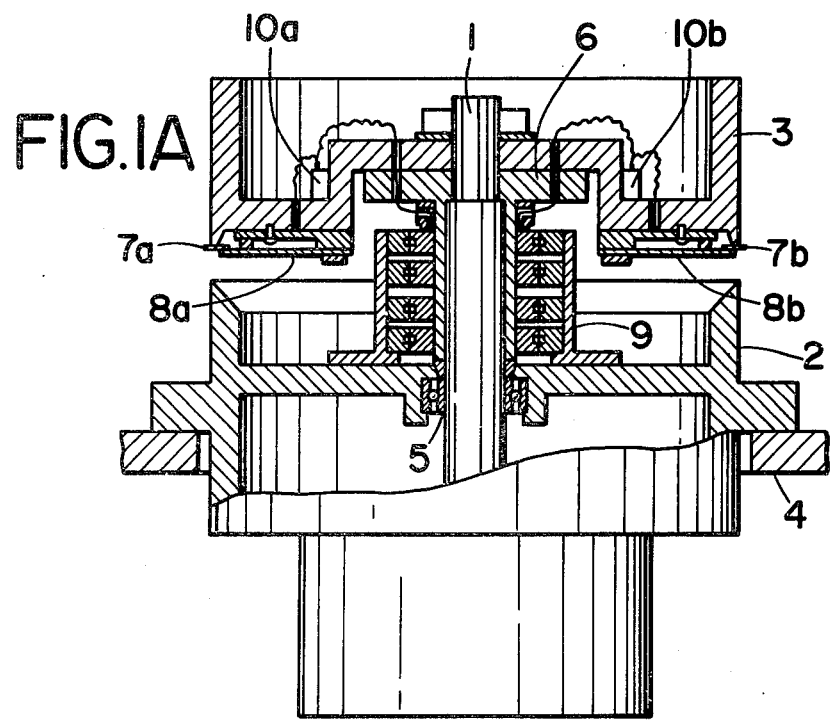
FIG. 1A is an elevational view of a rotary head drum assembly of a two-head helical type VTR according to one embodiment of this invention, and which is shown partly broken away.
Figure 1B:
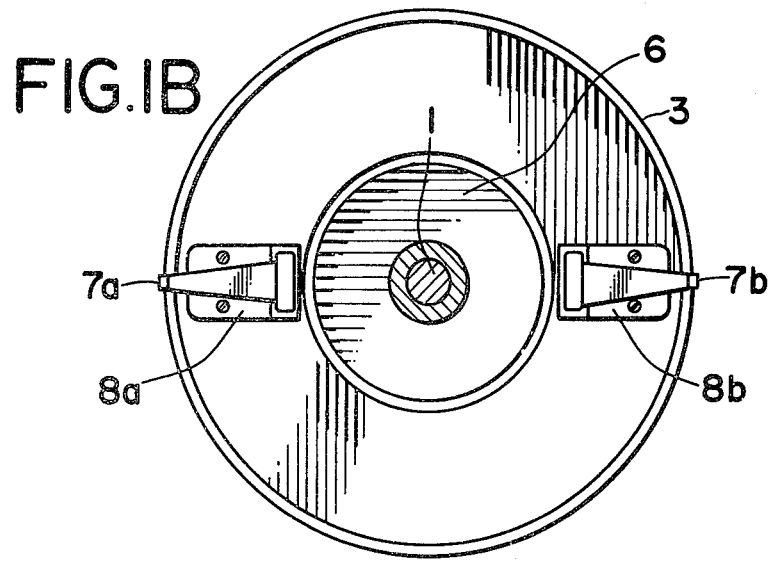
FIG. 1B is a bottom view of an upper drum of the rotary head drum assembly of FIG. 1A.

FIG. 1A and FIG. 1B show a rotary head drum assembly of a two-head helical type VTR. The apparatus in FIG. 1A includes a stationary lower drum 2 and a rotatable upper drum 3 supported on a rotatable shaft 1. FIG. 1B shows a bottom view of the upper drum 3. The lower end of the shaft 1 extends through a chassis 4 of the VTR and is directly coupled to a drum motor (not shown). The lower drum 2 is affixed to the chassis 4, for example, by bolts. Although not shown, a magnetic tape is slantly guided on the lower drum 2 and upper drum 3, as well known, in Ω-shape. The lower drum 2 has bearings 5 within it to provide rotatable support for the shaft 1. The shaft 1 is rotated at the speed of 30 revolutions per second by the not-shown motor. The upper drum 3 is fixed through a flange portion 6 to the shaft 1. On the bottom surface of the upper drum 3 are mounted two head-support members 8a and 8b which support magnetic heads 7a and 7b, respectively. The head-support members 8a and 8b, and therefore the magnetic heads 7a and 7b are diametrically opposed in the upper drum 3. That is, the angular distance between the magnetic-heads 7a and 7b is 180 degrees. The head-support members 8a and 8b each include piezo-ceramic material in a structure known as a bi-morph leaf which is a kind of electro-mechanical transducer which responds to electrical voltages with mechanical flexing or motion.

Figure 2A:
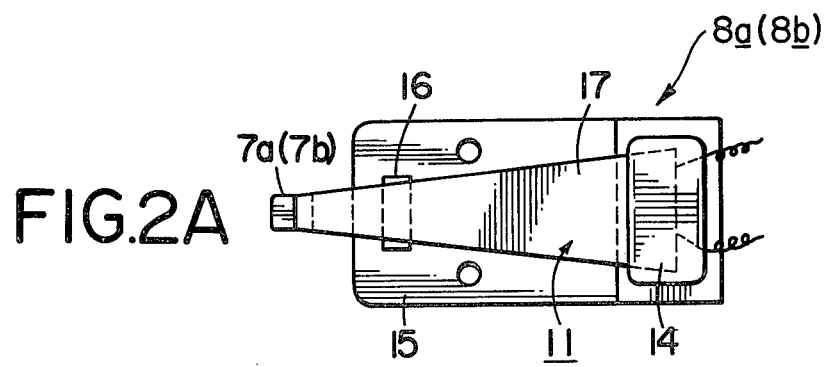
FIG. 2A is an enlarged bottom view of a head-support member in the rotary head drum assembly of FIG. 1A.
Figure 2B:
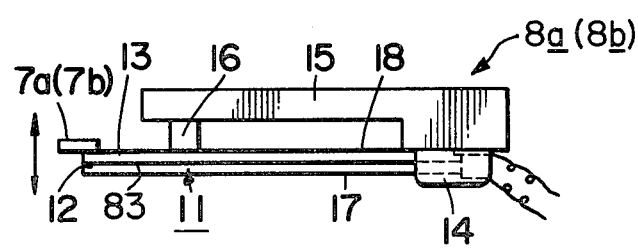
FIG. 2B is an enlarged side view of the head-support member of FIG. 2A.

FIG. 2A and FIG. 2B are an enlarged bottom view of the head-support member 8a or 8b, and an enlarged side view thereof, respectively. A bi-morph leaf 11 includes a lower ceramic plate 12 and an upper ceramic plate 13 bonded to the upper and lower surfaces of a metal plate 83 made of, for example, stainless steel or the like. The piezo-ceramic material may be Pb(Zr-Ti) O₃. Electrodes 17 and 18 are formed on the free surfaces of the bi-morph leaf 11. One end of the bi-morph leaf 11 is fixed to a head base 15 by a mass of adhesive 14. The magnetic head 7a or 7b is mounted on the free end of the bi-morph leaf 11. A damper 16 is fixed between the head base 15 and the bi-morph leaf 11 in order to damp out mechanical vibrations of the bi-morph leaf 11. Lead wires are connected to the electrodes 17 and 18. A voltage applied across the electrodes 17 and 18 deflects the magnetic head 7a or 7b in the direction normal to the rotary path of the magnetic head 7a or 7b as shown by the arrow in FIG. 2B.

In FIG. 1A, reference numeral 9 indicates a rotary transformer through which two channels of video signals to and from the magnetic heads 7a and 7b, and two drive signals to the bi-morph leaves 11 associated with the magnetic heads 7a and 7b are connected.

Figure 3:
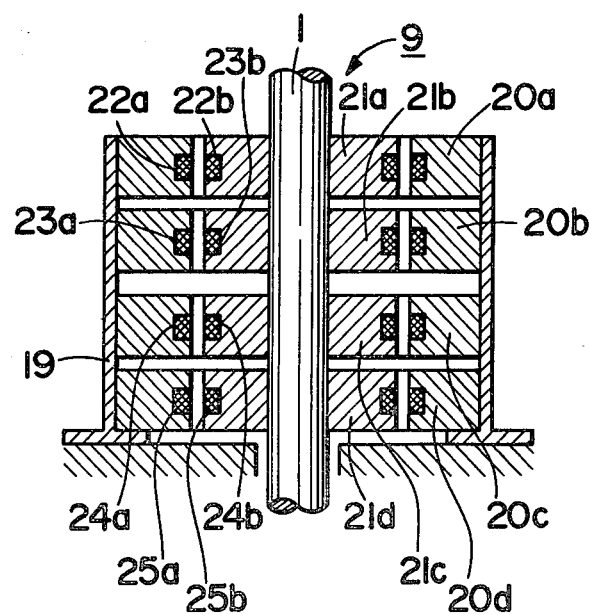
FIG. 3 is an enlarged cross-sectional view of a rotary transformer in the rotary head drum assembly of FIG. 1A.

FIG. 3 is an enlarged cross-sectional view of the rotary transformer 9. The rotary transformer 9 includes a cylindrical casing 19 fixed to the lower drum 2. Annular stators 20a, 20b, 20c and 20d are fixed on the inner circumferential surface of the cylindrical casing 19 one above the other. Annular rotors 21a, 21b, 21c and 21d are fixed on the shaft 1 in spaced relationship to the annular stators 20a, 20b, 20c and 20d to form air gaps therebetween. The stators 20a, 20b, 20c and 20d are arranged concentrically with the rotors 21a, 21b, 21c and 21d. Annular grooves are formed in the inner circumferential surfaces of the stators 20a, 20b, 20c and 20d, respectively. Annular grooves are formed in the outer circumferential surfaces of the rotor 21a, 21b, 21c and 21d, respectively. The annular grooves of the stators 20a, 20b, 20c and 20d face those of the rotors 21a, 21b, 21c and 21d, respectively. Coils 22a, 23a, 24a, 25a, 22b, 23b, 24b and 25b are fitted into the annular grooves of the stators 20a, 20b, 20c, and 20d, and the rotors 21a, 21b, 21c and 21d. The stators 20a and 20b, and the rotors 21a and 21b transmit video signals to and from the magnetic heads 7a and 7b. The stators 20c and 20d and the rotors 21c and 21d transmit the drive signals to be applied to the electrodes 17 and 18 of the bi-morph leaves 11 of the head-support members 8a and 8b. The number of turns on the secondary windings of coils 24b and 25b is larger than the number of turns of the primary windings coils 24a and 25a in order to boost the drive signals for the bi-morph leaves 11 of the head-support members 8a and 8b. The drive signals from the rotary transformer 9 are applied through amplitude-detectors 10a and 10b, shown in FIG. 1A, to the bi-morph leaves 11 of the had-support members 8a and 8b. The amplitude-detectors 10a and 10b are fixed to the upper drum 3.

Figure 4:
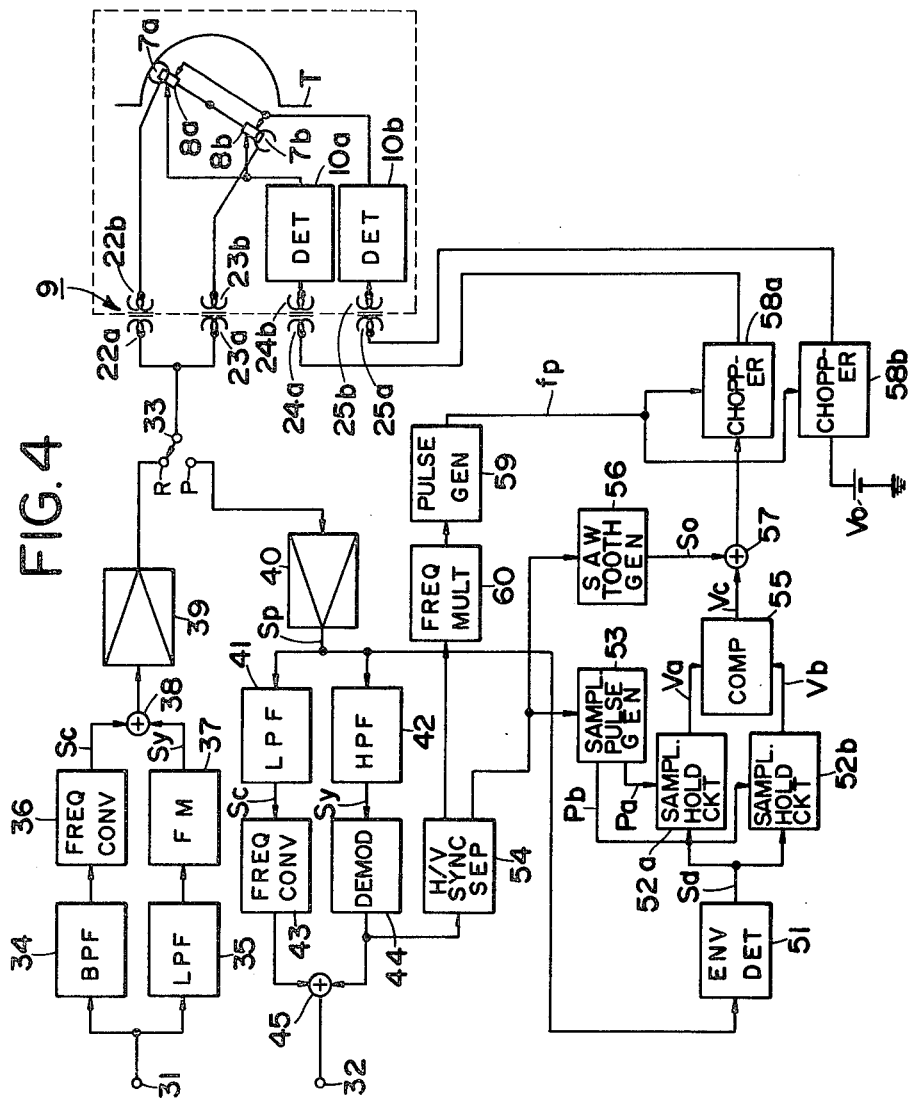
FIG. 4 is a block diagram of a recording/reproducing system with a head-position control circuit according to one embodiment of this invention.

FIG. 4 is a block diagram of a recording/reproducing system in use with a tracking control circuit according to one embodiment of this invention.

In FIG. 4, composite color video signals to be recorded on the magnetic tape T are supplied to a recording signal input terminal 31. The composite color video signals reproduced from the magnetic tape T are connected to a reproduced signal output terminal 32. Reference numeral 33 represents a recording/reproducing change-over switch.

Figure 5:
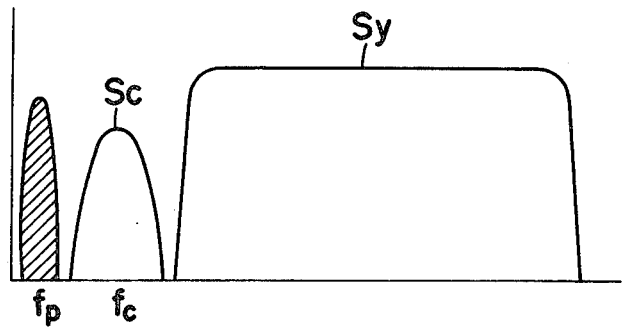
FIG. 5 is a graph showing the frequency spectrum of the respective signals in the block diagram of FIG. 4.

During recording, the change-over switch 33 is connected to recording terminal R. The color video signals from the input terminal 31 are supplied to a band pass filter 34 and a low pass filter 35. A chrominance signal is obtained from the band pass filter 34, and is supplied to a frequency converting circuit 36. A luminance signal is obtained from the low pass filter 35, and is supplied to an frequency modulator (FM) 37. The frequency converting circuit 36 functions to convert the chrominance signal to chrominance components Sc whose carrier frequency is lower than the carrier frequency of the chrominance signal. The carrier freqeuncy of Sc is, for example, 688 KHz. A frequency-modulated luminance signal Sy is obtained from the frequency modulator 37. The frequency-modulated luminance signal Sy includes frequency components of 3.6 MHz and 4.5 MHz for the synch-tip level or synchronizing signal level and white peak level. The converted chrominance signal Sc and the modulated luminance signal Sy are supplied to an adder 38. The output of the adder 38 is supplied to a recording amplifier 39. The output signal of the recording amplifier 39 has a frequency-spectrum as shown in FIG. 5. The output signal of the recording amplifier 39 is supplied for recording through the switch 33 to the coils 22a and 23a of the rotary transformer 9. Voltages are induced in the secondary coils 22b and 23b from the primary coils 22a and 23a. Accordingly, the recording signals are supplied to the magnetic heads 7a and 7b connected to the secondary coils 22b and 23b, respectively, and they are recorded on the running magnetic tape T guided by the head drum assembly, alternatively by the magnetic heads 7a and 7b. Parallel slant recorded tracks are formed on the magnetic tape T. One field of video signals is recorded in each track on the magnetic tape T.

In the reproducing operation, the change-over switch 33 is connected to a play-back contact P. The signals reproduced from the magnetic tape T alternately by the magnetic heads 7a and 7b are supplied through the rotary transformer 9 and the switch 33 to a reproducing amplifier 40. An output signal Sp of the reproducing amplifier 40 is supplied to a low pass filter 41 and a high pass filter 42. The converted chrominance signal Sc is obtained from the low pass filter 41. The modulated luminance signal Sy is obtained from the high pass filter 42. The converted chrominance signal Sc is supplied to a frequency-converting circuit 43 and is restored to the chrominance signal having the original carrier frequency. The modulated luminance signal Sy is supplied to a frequency demodulator 44, and is restored to the original luminance signal. The chrominance signal and the luminance signal are supplied to an adder 45. The reproduced color video signals are supplied to the output terminal 32.

In normal speed reproduction, the magnetic tape T is driven at the predetermined speed by a capstan and a pinch roller (not shown). For still reproduction, the magnetic tape T is stopped, and scanned by the magnetic heads 7a and 7b. The inclination of the scanning path of the magnetic heads 7a and 7b in still reproduction is skewed with respect to the recorded track due to the lack of tape motion. This results in tracking errors which this embodiment corrects.

Next, circuit components for correction of the tracking errors will be described with reference to FIG. 4.

The reproduced signal Sp from the reproducing amplifier 40 is supplied to an envelope detector 51. The detected output Sd is supplied to sample and hold circuits 52a and 52b. Sample pulses Pa and Pb are formed by a sample pulse generator 53, and supplied to the sample and hold circuits 52a and 52b, respectively. The sample pulses Pa are generated at the start of each field period (IV). The sampling pulses Pb are generated at the end of each field period (IV). The timing of the sample pulses is determined by a vertical synchronizing signal which is separated from the reproduced luminance signal by a sync separator circuit 54. An output voltage Va from the sample and hold circuit 52a and another output voltage Vb from the sample and hold circuit 52b are supplied to a voltage comparator 55. A DC voltage Vc depending on the difference between the output voltages Va and Vb is obtained from the voltage comparator 55.

The vertical synchronizing signal from the sync separator circuit 54 is supplied also to a saw tooth generator 56. A saw tooth signal So having a constant amplitude, synchronized with the vertical synchronizing signal is obtained from the saw tooth generator 56. The saw tooth signal So is mixed with the DC voltage Vc from the voltage comparator 55. The output of the adder 57 is supplied to a drive circuit consisting of chopper circuit 58a. A reference constant voltage Vo is supplied to another drive circuit consisting of chopper circuit 58b. The chopper circuit 58a chops the saw tooth signal So mixed with the DC voltage Vc. The other chopper circuit 58b chop the reference voltage Vo. Chopping pulses from a pulse generator 59 are supplied to the chopper circuits 58a and 58b. Horizontal synchronizing signals separated from the reproduced luminance signal by the synchronizing separator circuit 54 are supplied to a frequency multiplier 60 which multiplies the frequency of the horizontal synchronizing signals by two. The output of the frequency multiplier 60 triggers to the pulse generator 59 at twice the horizontal frequency. Thus, the chopping pulses having a frequency 2fh (about 31.5 KHZ) which is twice as high as the horizontal scanning frequency fh, are generated from the pulse generator 59. The frequency $f_p$ ($=2f_h$) of the chopping pulses is selected to avoid interference with the recording signal or reproduced signal.

In the recording or reproducing operation of the color video signals, the converted chrominance signal Sc has a carrier frequency component fc as shown in FIG. 5. Accordingly, the frequency component fp of the chopping pulses as shown by hatch in FIG. 5, is so selected as to be lower than the frequency zone (for example, fc±500 (KHZ)) of the converted chrominance signal Sc. Since the frequency of the saw tooth signal So is as low as 60 Hz, the saw tooth signal So can be sufficiently chopped by the chopping pulses which have a frequency in excess of 10 KHZ.

The output signals of the chopper circuits 58a and 58b are supplied to the primary coils 24a and 25a of the rotary transformer 9. The amplitude-detectors 10a and 10b are connected to the secondary coils 24b and 25b facing the primary coils 24a and 25a, respectively. The saw tooth signal So mixed with the DC voltage Vc, obtained from the amplitude-detector 10a is supplied to one 17 of the electrodes of the bi-morph leaves 11 of the head-support members 8a and 8b. The reference voltage Vo obtained from the other amplitude-detector 10b is supplied to the other 18 of the electrodes of the bi-morph leaves 11 of the head-support members 8a and 8b. Although not shown, a switch is provided in the circuit of this embodiment, in order to apply the drive signal to the bi-morph leaves 11 only in the still reproduction mode.

Next, operations for correction of the tracking error will be described with reference to FIG. 6 to FIG. 8.

Figure 6A:
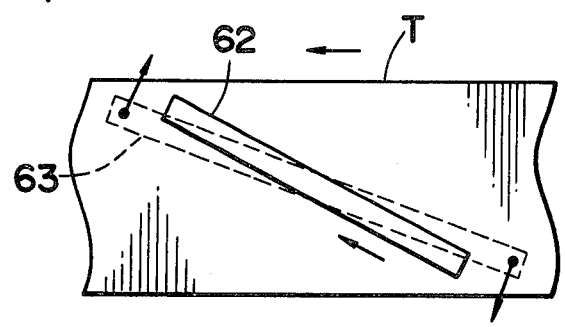
Figures 7A, 7F:
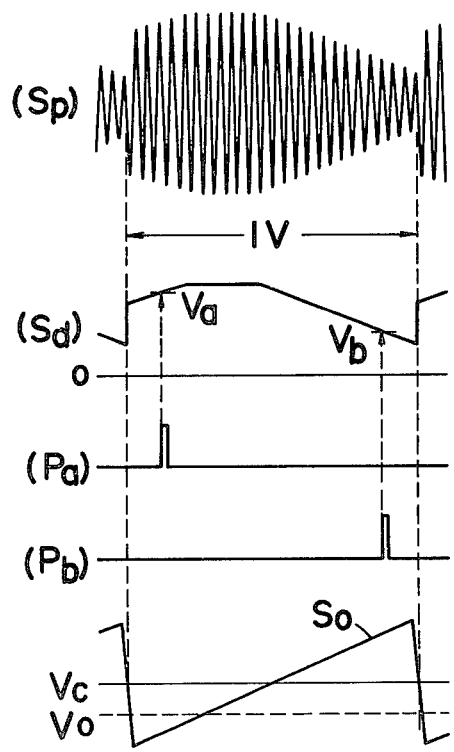

In FIG. 6A, FIG. 7A and FIG. 8A, one recorded track 62 shown in solid line is formed on the magnetic tape T by the magnetic head 7a or 7b scanning the magnetic tape T running at the predetermined speed in the direction shown by the arrow. Three modes of scanning paths 63 of the magnetic head 7a or 7b in still reproduction are shown by the dash lines in FIG. 6A, FIG. 7A and FIG. 8A. As shown in the figures, the scanning path 63 of the magnetic head 7a or 7b is skewed from the recorded track 62.

Figure 6B:
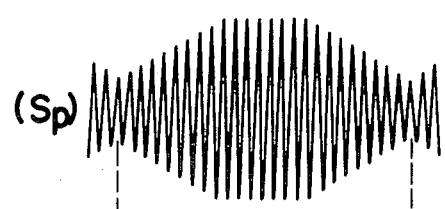
Figure 6C:
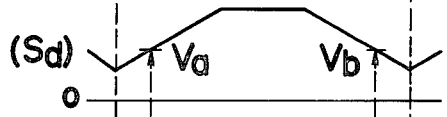
Figure 6D:
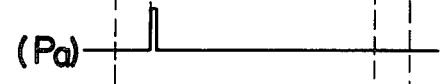
Figure 6E:
Figure 6F:
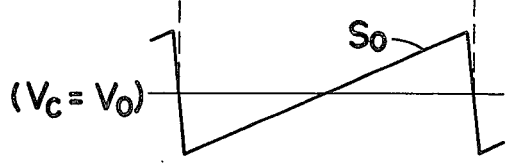

FIG. 6A shows the case where the central portions of the recorded track 62 and scanning path 63 coincide. In this case, the reproduced signal Sp as shown in FIG. 6B is obtained from the reproducing amplifier 40. The amplitude of the reproduced signal Sp is decreased at the of the beginning and end field period IV due to the misalignment of the head in those areas, and is increased at the middle stage of the field period IV. The detected output Sd as shown in FIG. 6C is obtained from the envelope detector 51, and it is sampled in the sample and hold circuits 52a and 52b by the sample pulses Pa and Pb as shown in FIG. 6D and FIG. 6E. The sampled voltages Va and Vb are supplied to the voltage comparator 55. When the voltages Va and Vb are equal to each other (Va=Vb), a DC voltage Vc equal to the reference voltage Vo is generated from the comparator 55. Thus, the drive voltage as shown in FIG. 6F is obtained from the adder 57. As is clear also from the following description, the drive voltage is transmitted to one 17 of the electrodes of the bi-morph leaves 11 of the head-support members 8a and 8b. The reference voltage Vo is transmitted to the other 18 of the electrodes of the bi-morph leaves 11 of the head-support members 8a and 8b. The bi-morph leaves 11, and therefore the magnetic heads 7a and 7b are deflected in accordance with the difference between the drive voltage and the reference voltage. The voltages (Vo) applied to the electrodes 17 and 18 pass through equality at the middle of the field period, since the central portions of the scanning path 63 and the recorded track 62 coincide with each other in that area. Accordingly, the bi-morph leaf 11 is not deflected at the central portion of the scanning path 63. However, the bi-morph leaf 11 and therefore the magnetic head 7a or 7b is deflected at both sides of the central portion of the scanning path 63 as shown by the arrows on the scanning path 63. The arrows are normal to the scanning path 63 indicative of the direction in which the deflection occurs. The displacement of the head 7a and 7b increases toward the ends of the scanning path 63 thus aligning the scanning path 63 with the recorded track 62, and thereby correcting the tracking error.

FIG. 7A shows the case in which the initial portions of the recorded track 62 and scanning path 63 substantially coincident with each other, and the terminal end portions of the recorded track 62 and scanning path 63 are separated much from each other. In this case, the reproduced signal Sp as shown in FIG. 7B is obtained from the reproducing amplifier 40, and the detected output Sd as shown in FIG. 7C is obtained from the envelope detector 51. The detected output Sd is supplied to the sample and hold circuits 52a and 52b, and sampled by the sample pulses Pa and Pb as shown in FIG. 7D and FIG. 7E. As understood from FIG. 7C, the sampled output Va is obtained from the sample and hold circuit 52a, and the sampled output Vb is obtained from the sample and hold circuit 52b. Since the sampled output Va has a higher voltage than the sampled output Vb (Va>Vb), the DC voltage Vc generated from the voltage comparator 55 is higher than the reference voltage Vo, as shown in FIG. 7F. The drive voltage which is obtained by mixing the saw tooth signal So with the DC voltage Vc, and the reference voltage Vo are applied to the electrodes of the bi-morph leaf 11, respectively. The voltage difference across the electrodes of the bi-morph leaf 11 is low at the initial end of the scanning path 63. It passes through zero near the initial end of the scanning path 63 and increases to its highest value nearer the terminal end of the scanning path 63. The arrows on the scanning path 63 in FIG. 7A show the magnitude and direction of the displacement of the magnetic heads 7a and 7b at the initial and terminal ends of the scanning path 63. Thus, the positions of the magnetic heads 7a and 7b are controlled to correct the tracking errors.

FIG. 8A shows the case in which the terminal portions of the recorded track 62 and scanning path 63 substantially coincident with each other, and the initial portions of the recorded track 62 and scanning path 63 are separated from each other. In this case, the reproduced signal Sp as shown in FIG. 8B is obtained from the reproducing amplifier 40, and the detected output Sd as shown in FIG. 8C is obtained from the envelope detector 51, and is supplied to the sample and hold circuits 52a and 52b. The detected output Sd is sampled by the sample pulses Pa and Pb as shown in FIG. 8D and FIG. 8E. The sampled output Va from the sample and hold circuit 52a is lower than the sampled output Vb from the sample and hold circuit 52b. The sampled outputs Va and Vb are supplied to the voltage comparator 55. The DC voltage Vc from the comparator 55 is a lower voltage than the reference voltage Vo, as shown in FIG. 8F. The drive voltage which is obtained by mixing the saw tooth wave signal So with the DC voltage Vc, and the reference voltage Vo are applied to the electrodes of the bi-morph leaf 11, respectively. As shown by the arrows in FIG. 8A, the magnetic head 7a or 7b is deflected more at the initial end of the scanning path 63, and the deflection of the magnetic head 7a or 7b decreases toward the terminal end of the scanning path 63. The deflection passes through zero near the terminal end of the scanning path 63.

Figure 9:
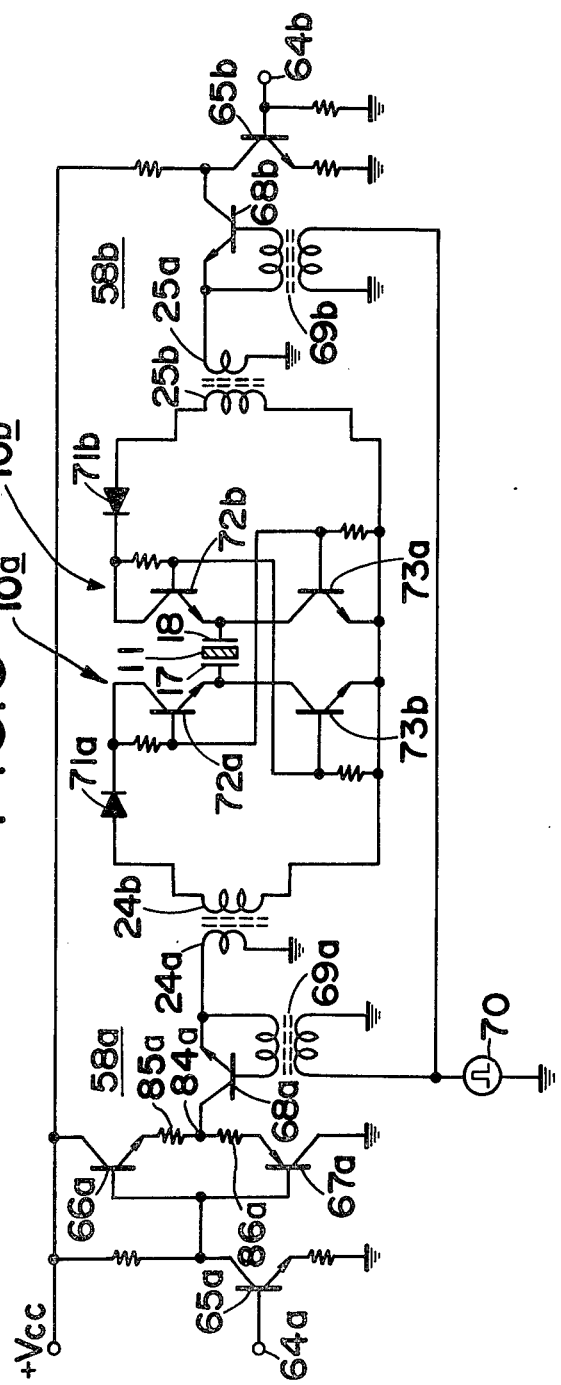
FIG. 9 is a circuit diagram of one example of a part of the block diagram of FIG. 4.

FIG. 9 shows a circuit diagram of one embodiment of the chopper circuits 58a and 58b.

The saw tooth signal as shown in FIG. 10A, whose mean value is controlled by the output of the voltage comparator 55, and which corresponds to the saw tooth signal shown in FIG. 6F, FIG. 7F or FIG. 8F, is supplied to an input terminal 64a. The polarity of the saw tooth signal is inverted by a transistor 65a. The polarity-inverted saw tooth signal is supplied to bases of transistors 66a and 67a arranged in push-pull. The saw tooth signal comes to the junction 84a of resistors 85a and 86a connected respectively to the emitters of the transistors 66a and 67a. The collector of chopper transistor 68a is connecting junction 84a. The emitter of the transistor 68a is connected through the primary coil 24a of rotary transformer 9 to ground. Chopping pulses are supplied through between transformer 69a to the base and emitter of chopper transistor 68a from a pulse signal source 70. The chopping pulses cause the transistor 68a to be alternately switched on and off. The pulse signal source 70 is equivalent to the above described pulse generator 59. A chopped pulse signal as shown in FIG. 10B, having the frequency fp is generated across the secondary coil 24b of the rotary transformer 9. The chopped pulse signal is modulated by the saw tooth wave signal. The pulse-amplitude-modulated signal is supplied to amplitude detector 10a through a diode 71a and a resistor to bases to transistors 72a and 73a. The collector of the transistor 72a is connected to a cathode of the diode 71a, and the emitter of the transistor 72a is connected to one 17 of the electrodes of the bi-morph leaf 11. The collector of the transistor 73a is connected to the other 18 of the electrodes of the bi-morph leaf 11, and the emitter of the transistor 73a is connected to one end of the secondary coil 24b of the rotary transformer 9. Accordingly, the pulse voltage across the secondary coil 24b is applied through the transistors 72a and 73a to the electrodes of the bi-morph leaf 11. Since the bi-morph leaf 11 is a capacitive load, the pulsating detected signal is smoothed. The above described drive voltage in which the saw tooth signal So is added to the DC voltage Vc, is applied to the bi-morph leaf 11 in such a manner that the one electrode 17 is given a positive polarity and the other electrode 18 is given a negative polarity.

The diode 71a and the transistors 72a and 73a constitute one example of the amplitude detector 10a. In FIG. 9, only one bi-morph leaf 11 of the head-support members 8a and 8b is shown. Although not shown in FIG. 9, the other bi-morph leaf 11 of the head-support members 8a and 8b is connected in parallel with the one bi-morph leaf 11 of the head-support members 8a and 8b.

The reference voltage drive circuit consisting of chopper circuit 58b as includes an input terminal 64b, a chopper transistor 65b, and transistors 68b and transformer 69b. Except for the omission of the push-pull circuit of transistors 66a and 67a, chopper circuit 58b is identical to chopper circuit 58a. A constant DC voltage which is nominally about ½ Vcc is supplied to the input terminal 64b. A DC voltage of ½ Vcc is generated at a collector of the transistor 65b. A chopped reference voltage Vo as shown in FIG. 10C is connected to the primary coil 25a and a corresponding chopped reference signal is generated between the ends of the secondary coil 25b of the rotary transformer 9. The chopped reference signal is supplied to amplitude detector 10a through the diode 71b and a resistor to bases of transistors 72b and 73b. The reference voltage Vo is applied to the bi-morph leaf 11. The transistors 72b and 73b are connected to the electrodes 17 and 18, and the transistors 72a and 73a in such a manner that when one electrode 18 is positive, the other electrode 17 is negative.

In the above-described manner, the difference voltage between the saw tooth signal mixed with the DC voltage Vc and the reference voltage Vo is applied to drive the bi-morph leaf 11.

Figure 11:
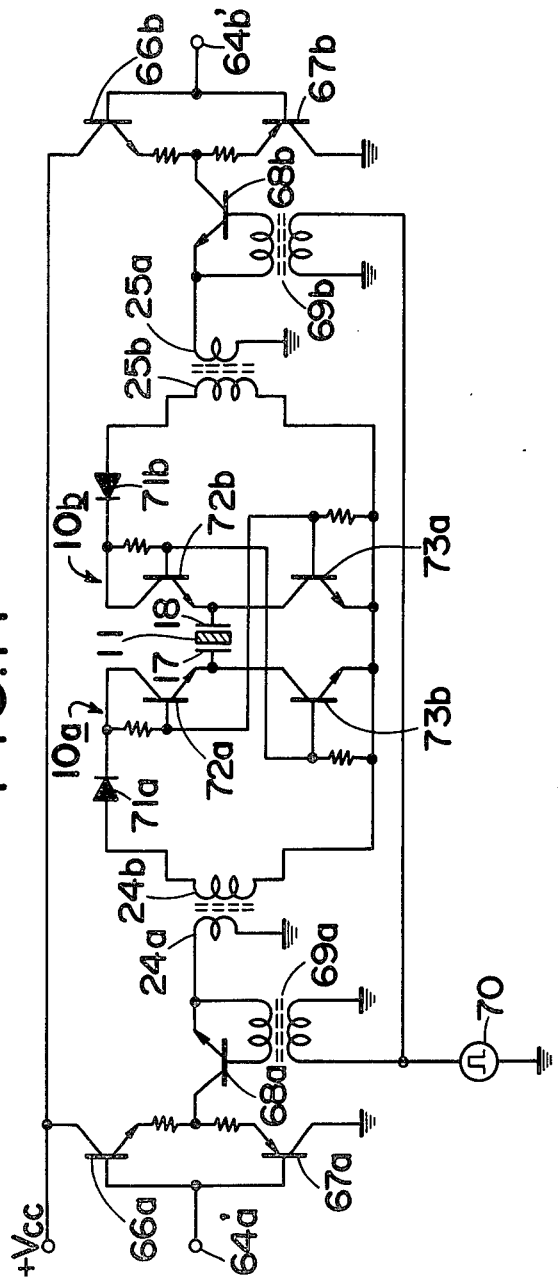
FIG. 11 is a circuit diagram of another example of a part of the block diagram of FIG. 4.

In the above description, the drive voltage in which the saw tooth signal So is mixed with the DC voltage Vc, is applied to one 17 of the electrodes of the bi-morph leaf 11, while the reference voltage Vo is applied to the other 18 of the electrodes of the bi-morph leaf 11. However, saw tooth signals in opposite phases may be applied to the electrodes 17 and 18 of the bi-morph leaf 11. In this case, the circuit of FIG. 9 is modified to a circuit of FIG. 11. Referring to FIG. 11, the drive circuit for the other 18 of the electrodes of the bi-morph leaf 11 includes transistors 66b and 67b arranged in push-pull, similar to the drive circuit for the one electrode 17 of the bi-morph leaf 11. The above described saw tooth signal whose mean value is controlled by the output of the comparator 55, is applied to the one electrode 17 of the bi-morph leaf 11, while a saw tooth signal in phase opposite to the above-described saw tooth signal, whose mean value is equal to the reference voltage Vo, is applied to the other electrode 18 of the bi-morph leaf 11.

In the first case of the tracking error shown in FIG. 6A, the saw tooth signals $S_o$ and $S_o'$ whose mean values are equal to each other, are applied to the electrodes 17 and 18 of the bi-morph leaf 11, respectively, as shown in FIG. 12A.

In the second case of the tracking error shown in FIG. 7A, the saw tooth signals $S_o$ and $S_o'$ whose mean values are Vc and Vo (Vo<Vc) respectively, are applied to the electrodes 17 and 18 of the bi-morph leaf 11, respectively, as shown in FIG. 12B.

In the third case of the tracking error shown in FIG. 8A, the saw tooth signals So and So' whose mean values are Vc and Vo (Vo>Vo), respectively, are applied to the electrodes 17 and 18 of the bi-morph leaf 11, respectively, as shown in FIG. 12C.

For the same deflection of the bi-morph leaf 11, the amplitude of the saw tooth signals So and So' in opposite phases which are applied to the electrodes 17 and 18, is half as large as the saw tooth wave signal So which is applied only to the one electrode 17 in the circuit of FIG. 9. Accordingly, when the boosting ratio of the rotary transformer 9 is the same in the circuits of FIG. 9 and FIG. 11, the source voltage +Vcc in FIG. 11 can be half as high as that in FIG. 9.

Figure 13:
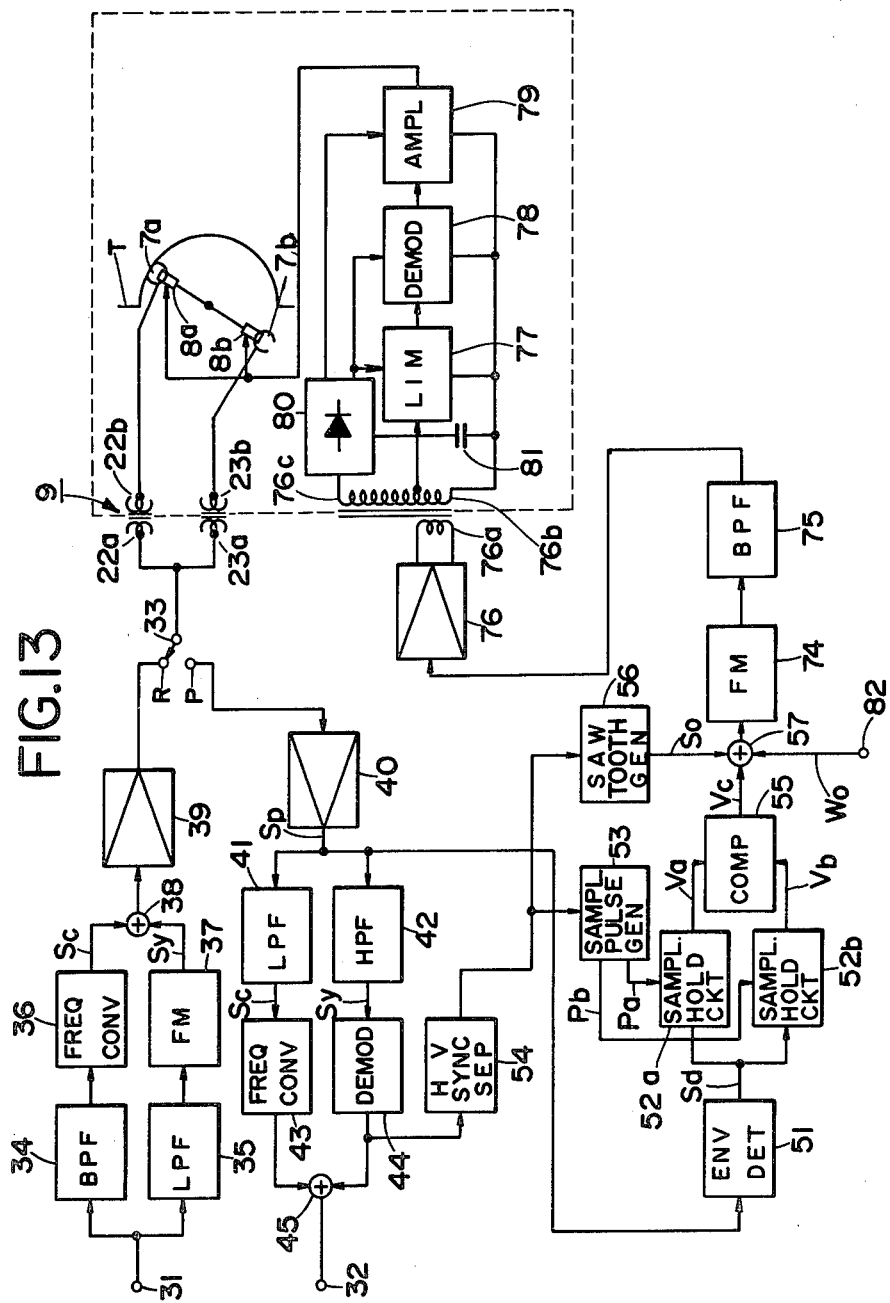
FIG. 13 is a block diagram according to another embodiment of this invention, similar to FIG. 4.

FIG. 13 is a block diagram of a recording/reproducing system in use with a tracking control circuit according to another embodiment of this invention. Parts in this embodiment which correspond to those in FIG. 4, are denoted by the same reference numerals, the description of which will be omitted. In this embodiment, the output of the adder 57 is supplied to a frequency modulator 74. The central frequency $f_f$ of the frequency modulator 74 is, for example, 20 KHZ which is lower than the carrier frequency fc of the chrominance signal Sc in the same manner as the frequency fp of the frequency spectrum of FIG. 5. The output of the frequency modulator 74 is supplied to a band pass filter 75. The frequency zone of the output of the band pass filter 75 does not overlap the frequency zones of the chrominance signal Sc and luminance signal Sy in the same manner as shown in FIG. 5. The output of the band pass filter 75 is supplied to an amplifier 76. The amplified signal is applied to a primary coil 76a of the rotary transformer 9. Primary transformer 76a is not shown in FIG. 1 and FIG. 3. A voltage is induced in a secondary coil 76b facing the primary coil 76a in the rotary transformer 9. One terminal 76c of the secondary coil is connected to a rectifier 80. A capacitor 81 is connected between the rectifier 80 and another terminal 76d of the secondary coil. An output signal is picked up from a tap 76e between the terminals 76b and 76c of the secondary coil, and it is supplied to a limiter 77. The output of the limiter 77 is demodulated by a frequency demodulator 78. The demodulated output signal (saw tooth signal) is amplified by an amplifier 79, and then supplied to the bi-morph leaves 11 of the head-support members 8a and 8b. A similar channel (not shown) may be employed to connect a reference signal, corresponding to Vo in FIG. 4, to the head-support members 8a and 8b. Thus, the tracking of the magnetic heads 7a and 7b is controlled in the same manner as in the first-mentioned embodiment.

As occasion demands, any other head-position control signal may be suppied to an input terminal 82 connected to the adder 57. For example, a head wobbling control signal Wo from a wobbling signal generator (not shown) of a type well known in the art for wobbling the magnetic head to control the tracking may be supplied to the input terminal 82.

Moreover, the output of the adder 57 is frequency-modulated by the frequency modulator 74 in this embodiment. However, the output of the adder 57 may be phase-modulated or pulse-width-modulator without departing from the scope of the invention. In such a case, a phase modulater or a pulse width modulator is used instead of the frequency modulator 74 in this embodiment.

In the above description of this invention, the different drive voltages are applied to the electrodes 17 and 18 to deflect the di-morph leaf 11 upward and downward with respect to the rotary path of the magnetic heads 7a and 7b. However, this invention may be applied in an apparatus where the bi-morph leaf 11 is deflected only upward or downward with respect to the rotary path of the magnetic heads 7a and 7b.

Further in order to reduce the interference with the luminance signal due to unwanted radiation from the chopping frequency, the frequency fp of the chopping pulses may be selected to be equal to $[(n+1)\frac{1}{2} fh]$, or to be frequency-interleaved with the luminance signal.

Although the preceding description is directed to tracking control during still or slow motion reproduction in the above embodiments, this invention may be applied to a tracking control during normal reproduction in which the magnetic tape T runs at the same speed as in the recording operation.

Moreover, the head-support member may also be designed to rotationally deflect the magnetic head in the same direction as the rotary path of the magnetic head either alone or in conjunction with the motion normal to the rotary path. In such a case, a time base error called "jitter" or "drift" may be detected, and a drive voltage in response to the detected time base error is applied to the bi-morph leaf 11 to eliminate the time base error. This invention may be applied to transmit such a drive voltage.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

What is claimed is:

1. A system for reproducing a video signal recorded in parallel track sections on a recording medium, said system comprising:
    a fixed base portion and a rotary drum portion rotatably mounted on said base portion;
    signal transducer means for scanning along the track sections and reproducing the video signal from said recording medium;
    control signal generating means fixed relative to said base portion for producing a tracking control signal which corresponds to mis-tracking of said signal transducer means relative to a predetermined section of the recorded track;
    support means on said rotary drum portion for supporting said signal transducer means and being responsive to said tracking control signal to displace said transducer means transversely with respect to the direction along said track sections so as to maintain substantial alignment between the transducer means and the track section being scanned;
    rotary transformer means for electrically applying said tracking control signal to said support means and including a primary winding fixed relative to said base portion and a secondary winding fixed relative to said rotary drum portion; and
    control signal processing means including converting means connected between said control signal generating means and said primary winding for converting said tracking control signal to a corresponding signal of alternating form, and reconverting means connected between said secondary winding and said support means for reconverting said signal of alternating form back to said tracking control signal.

2. The system according to claim 1, wherein said signal transducer means is a magnetic head with an air gap, and said support means includes a flexible element adapted to flex in response to said tracking control signal to move said head in a direction along the length of said gap and substantially perpendicularly with respect to the longitudinal direction of said parallel track sections.

3. The system according to claim 2, wherein said support means for supporting said magnetic head comprises piezo-ceramic material.

4. The system according to claim 3, wherein said piezo-ceramic material is a bi-morph leaf assembly which moves said magnetic head in either direction along the gap length from a predetermined recording position.

5. The system according to claim 4, wherein said converting means includes a chopper circuit for chopping said tracking control signal to be supplied to said primary winding, and said reconverting means includes a level detector for detecting the level of the chopped control signal supplied from said secondary winding of said rotary transformer means.

6. The system according to claim 5, wherein the frequency band of said chopped control signal is selected outside the frequency band of the video signal reproduced from said signal transducer means.

7. The system according to claim 4, wherein said converting means is constituted by a modulator for modulating said tracking control signal to be supplied to said primary winding and said deconverting means is constituted by a demodulator for demodulating the modulated control signal supplied from said secondary winding of said rotary transformer means.

8. The system according to claim 7, wherein said control signal processing means further includes a rectifier circuit for rectifying the modulated control signal obtained from the secondary winding of said rotary transformer and for feeding the resulting rectified signal as a form of D.C. power to said demodulator.

9. The system according to claim 7 wherein said modulator is a frequency modulator and said demodulator is a frequency demodulator.

10. A system for recording and reproducing video signals on a magnetic medium comprising:
    a stationary part and a rotating part;
    at least one transducer on said rotating part for repeatedly scanning the record medium and thereby recording and reproducing video signals on said magnetic medium;
    at least a first rotating transformer having a first annular stator on said stationary part and a first annular rotor on said rotating part concentric with, and facing said first annular stator for transmitting video signals between said stationary and rotating parts;

said annular rotor being connected to said at least one transducer;

means for providing a dc signal varying with the positional relationship between a track on said magnetic medium in which a video signal is recorded and the scanning path of said at least one transducer during reproduction;

a pulsed control signal generator operative to generate control signal pulses varying according to said varying dc signal;

at least a second rotating transformer having a second annular stator on said stationary part receiving said control signal pulses and a second annular rotor on said rotating part concentric with and facing said second annular stator for transmitting said control signal pulses from said stationary part to said rotating part;

electro-mechanical means mounted on said rotating part and providing support means for supporting said at least one transducer on said rotating part; and means on said rotating part receiving said control signal pulses from said second rotor of the second rotating transformer and reconverting the same to the corresponding varying dc signal;

said electro-mechanical means being responsive to the reconverted dc signal to displace said at least one transducer relative to said rotating part in accordance with variations in said dc signal.

11. A system according to claim 10; in which said pulsed control signal generator includes chopper means.

12. A system according to claim 10; in which said pulsed control signal generator includes modulator means.

* * * * *